United States Patent
Peterson et al.

(10) Patent No.: US 10,108,236 B2
(45) Date of Patent: Oct. 23, 2018

(54) SYSTEM AND METHOD FOR ADJUSTING COOLING FAN CONTROL SETTINGS BASED ON IDENTIFICATION OF A MODULE

(71) Applicant: Dell Products, LP, Round Rock, TX (US)

(72) Inventors: Chris E. Peterson, Austin, TX (US); Dominick A. Lovicott, Round Rock, TX (US); Corey D. Hartman, Hutto, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 316 days.

(21) Appl. No.: 14/718,767

(22) Filed: May 21, 2015

(65) Prior Publication Data

US 2016/0342181 A1 Nov. 24, 2016

(51) Int. Cl.
*G06F 19/00* (2018.01)
*G06F 1/20* (2006.01)
*G05B 15/02* (2006.01)

(52) U.S. Cl.
CPC ............. *G06F 1/206* (2013.01); *G05B 15/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,249,741 A * | 10/1993 | Bistline | .............. | G05D 23/1906 165/80.3 |
| 5,777,897 A * | 7/1998 | Giorgio | ................ | F24F 11/0079 700/299 |
| 5,935,244 A | 8/1999 | Swamy et al. | | |
| 7,139,169 B2 * | 11/2006 | Alperin | ...................... | G06F 1/20 361/679.4 |
| 7,489,092 B1 * | 2/2009 | Larky | ................... | F04D 27/004 318/34 |
| 8,527,803 B2 | 9/2013 | Paul et al. | | |
| 8,838,286 B2 | 9/2014 | Florz-Larrahondo et al. | | |
| 8,917,512 B2 * | 12/2014 | Lozon | .................. | H05K 7/1498 211/153 |
| 8,917,513 B1 * | 12/2014 | Hazzard | ............... | H05K 7/1498 211/153 |
| 8,949,630 B2 | 2/2015 | Peterson et al. | | |
| 2004/0264124 A1 * | 12/2004 | Patel | .................. | H05K 7/20736 361/679.46 |
| 2006/0032250 A1 * | 2/2006 | Flanigan | ............ | G05D 23/1905 62/157 |
| 2006/0228223 A1 * | 10/2006 | Chen | ...................... | F04D 27/004 417/44.1 |
| 2007/0109725 A1 * | 5/2007 | Lindell | .............. | H05K 7/20836 361/600 |

(Continued)

*Primary Examiner* — Kidest Bahta
(74) *Attorney, Agent, or Firm* — Larson Newman, LLP

(57) ABSTRACT

An information handling system includes a memory and a controller. The memory stores settings for components within the information handling system. The controller can communicate with the memory. The controller detects a presence of a module, receives parameters of the module from the module, determines information for the module based on the parameters of the module, and updates the settings for the components based on the information for the module.

18 Claims, 4 Drawing Sheets

(56) References Cited

U.S. PATENT DOCUMENTS

| | | | |
|---|---|---|---|
| 2010/0079094 A1* | 4/2010 | Beltman | G06F 1/206 318/460 |
| 2010/0194321 A1* | 8/2010 | Artman | G06F 1/206 318/454 |
| 2012/0215359 A1* | 8/2012 | Michael | G06F 1/206 700/275 |
| 2013/0047650 A1* | 2/2013 | Moss | H05K 7/20836 62/186 |
| 2013/0139529 A1* | 6/2013 | Lu | F25D 17/06 62/89 |
| 2013/0258582 A1* | 10/2013 | Shelnutt | G06F 1/206 361/679.48 |
| 2013/0326259 A1 | 12/2013 | Paul et al. | |
| 2013/0336805 A1 | 12/2013 | Shibita et al. | |
| 2014/0032011 A1* | 1/2014 | Artman | G05D 23/1932 700/300 |
| 2017/0273222 A1* | 9/2017 | Roy | H05K 7/20745 |

\* cited by examiner

SYSTEM AND METHOD FOR ADJUSTING COOLING FAN CONTROL SETTINGS BASED ON IDENTIFICATION OF A MODULE

FIELD OF THE DISCLOSURE

The present disclosure generally relates to system and method for adjusting system settings based on parameters of a module.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

An information handling system can include cooling fans that can be controlled using cooling fan control settings. A controller of the information handling system can respond to many scenarios, including setting different fan speeds to cool components based on thermal conditions in the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
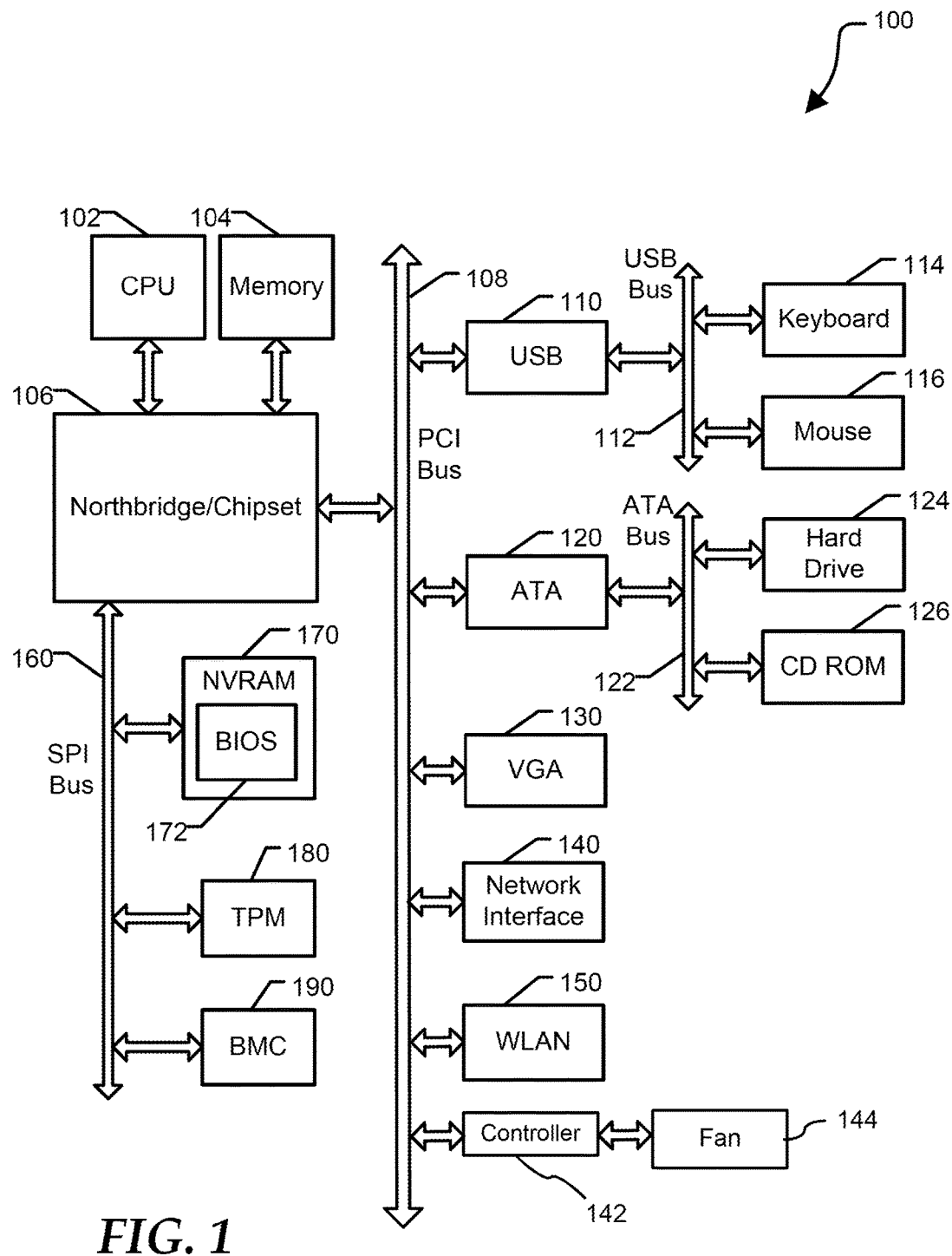
FIG. 1 is a block diagram of an information handling system according to at least one embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer, such as desktop or laptop, tablet computer, mobile device (e.g., personal digital assistant (PDA) or smart phone), server (such as blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

In an embodiment, an information handling system can include a controller and a cooling fan. The controller can determine whether a module has been connected to the information handling system. When a module is connected to the information handling system the controller of the information handling system can communicate with a controller of the module to retrieve parameters and other information about the module. In an embodiment, the parameters and information about the module can include the configuration of the module, such as components within the module, sensors within the module, cooling fans within the module, or the like.

The controller of the information handling system can then utilize the information about the module to determine what, if any, changes may be made to settings of the information handling system stored within a memory of the controller. In an embodiment, the settings can be cooling fan settings, power settings, or the like. In an embodiment, the controller of the information handling system can use both the information from the module and a current configuration of the information handling system to determine how to adjust the settings. The controller can then update or adjust settings, and can utilize these updated settings to control different components within the information handling system.

In an embodiment, the controller can determine that a new module has been connected to the information handling system, and the controller can receive the parameters and other information for this module. The parameters and information about the new module can be different from the parameters and information last module that was connected to the information handling system. The controller can then use the parameters of the new module along with information about the current configuration of the information handling system to determine what, if any, changes should be made to the settings of the information handling system. The controller can then update or adjust settings based on the parameters of the new module, and can utilize these updated settings to control different components within the information handling system.

FIG. 1 illustrates an information handling system 100 including a processor 102, a memory 104, a northbridge/chipset 106, a PCI bus 108, a universal serial bus (USB) controller 110, a USB 112, a keyboard device controller 114, a mouse device controller 116, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a non-volatile random access memory (NVRAM) 170 for storing a basic input/output system (BIOS) 172, a trusted platform module (TPM) 180, and a baseboard management controller (BMC) 190. Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of northbridge/chipset 106 can be integrated within CPU 102.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and operating systems to interact with devices, such as a keyboard, a display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

In an embodiment, the BIOS 172 can be substantially compliant with one or more revisions of the UEFI specification. The UEFI standard replaces the antiquated personal computer BIOS system found in some older information handling systems. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that the disclosed systems and methods can be implemented at substantially any information handling system having firmware.

In an embodiment, the information handling system 100 includes a controller 142, and a cooling fan 144. In different embodiments, the controller 142 can separate from the cooling fan 144, as shown in FIG. 1, can be incorporated within the cooling fan, or the like. In an embodiment, functions of the controller 142 can be divided between multiple controllers or components without varying from the scope of the disclosure. In an embodiment, the controller 142 can be any type of controller in the information handling system 100, such as a baseboard management controller, an embedded controller, or the like. The controller 142 can determine whether a module has been connected to the information handling system. In an embodiment, the module can be connected to an external surface, such as a front panel, of the information handling system 100, can be connected internal to the information handling system, or the like. When a module is connected to the information handling system 100, the controller 142 can communicate with a controller of the module to retrieve parameters and other information for the module.

The controller 142 can utilize the information about the module to determine what, if any, changes may be made to settings for different subsystems of the information handling system 100 stored within a memory of the controller. For example, parameters and information from the module can indicate that the module includes one or more hard disk drives (HDDs) that are sensitive to fan vibrations, and may include a request that the fan speeds of the cooling fan 144 be kept below a specific threshold. The controller 142 can then use both the information from the module and a current configuration of the information handling system 100 to determine how to change the fan control settings to reduce vibrations caused by the cooling fan 144. The controller 142 can then update fan control settings, and can utilize the updated fan control settings to set different fan speeds of the cooling fan 144 based on thermal conditions within the information handling system, and/or the module.

Figure 2:
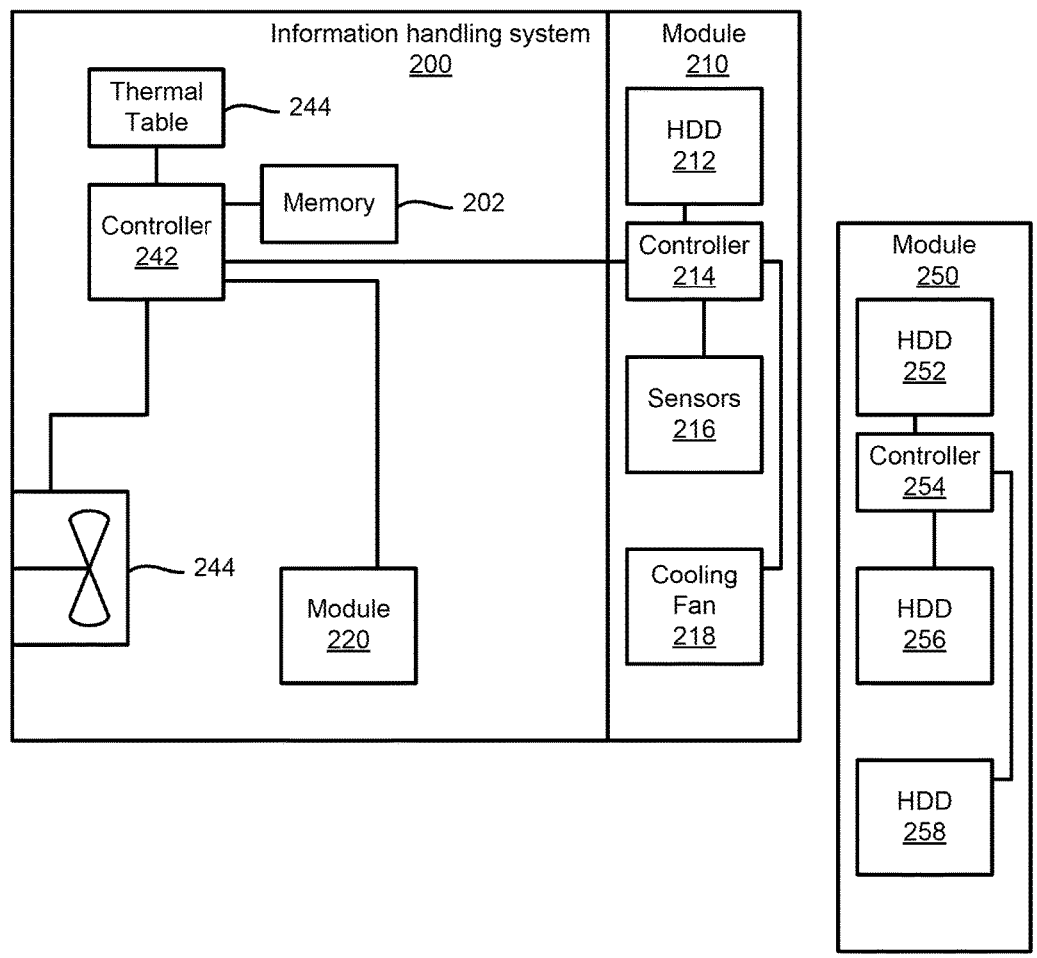
FIG. 2 is a block diagram of the information handling system including a module connected to the information handling system according to at least one embodiment of the present disclosure.

FIG. 2 illustrates an information handling system 200 and modules 210, 220, and 250 connected to the information handling system according to at least one embodiment of the present disclosure. The information handling system 200 includes a memory 202, a controller 242, and a cooling fan 244. In an embodiment, the controller 242 is in communication with the memory 202 and with the cooling fan 244. In an embodiment, the controller 242 includes a thermal table 244, which may be stored in a memory internal to the controller, may be stored in a memory of the information handling system 100 that is accessible by the controller, such as memory 202, or the like. In an embodiment, the controller 242 can be a baseboard management controller, an embedded controller, or any similar controller that can enable communication to the information handling system including an integrated Dell Remote Access Controller (iDRAC). The module 210 includes one or more hard disk drives (HDDs) 212, a controller 214, sensors 216, and a cooling fan 218. In an embodiment, the controller 214 is in communication with the HDD 212, with the sensors 216, and with the cooling fan 218. In different embodiments, the modules 210 and 250 may have many different configurations, and each configuration may include any combination of the HDD 212, the controller 214, the sensors 216, and the cooling fan 218. For example, the module 250 includes HDDs 252, 256, and 258, and a controller 254.

During operation the controller 242 can utilize different settings, such as a fan control setting, stored in the memory 202, to control different components, such as the fan cooling fan 244, within the information handling system. For example, the controller 242 can utilize a fan control setting to change the fan speed of the cooling fan 244 depending on thermal conditions within the information handling system 200.

The controller 242 can detect that module 210, 220, and/or 250 is connected to the information handling system 200. In an embodiment, the connection of the of the module 210 or 250 can be via an external panel, such as the front panel, of the information handling system 200, while the connection of the module 220 can be within the information handling system as a component of the information handling system. In an embodiment, the modules 210, 220, and 250 can have different components and/or parameters that can change the thermal conditions within the information handling system 200. For example, the module 210 may include the cooling fan 218, which may provide additional cooling capabilities to the information handling system 100.

Upon the module 210, 220, or 250 being connected to the information handling system 200, the controller of the module can be placed in communication with the controller 242. The controller 242 can then communicate with the controller of the module to interact with the module, and the controller can determine a settings response based on the module. In an embodiment, the controller 242 can make one set of changes to the current settings in the information handling system 200 based on module 210 being connected to the information handling system, can make a different set of changes to the current settings in the information handling system based on module 220 being connected to the information handling system, and can make an even different set of changes to the current settings in the information handling system based on module 250 being connected to the information handling system. Thus, different parameters and/or information for each of the modules 210, 220, and 250 can cause the controller 242 to make different changes to the settings of the information handling system 200. In an embodiment, the settings of the information handling system 200 can include power settings, cooling fan control settings, or the like.

In an embodiment, the adjusting of the thermal table 244 based on information about the module 210, 220, or 250 connected to the information handling system 200 can be performed in substantially the same manner for both of the modules. However, for clarity and brevity, the updating settings, such as settings in the thermal table 244, will only be discussed with respect to module 210. The parameters for the module 210 can provide different information about thermal controls associated with the module. The controller 242 can then utilize the information to determine what adjustments, if any, are needed to the thermal table 244, power control settings, the fan control settings, or the like.

In an embodiment, the information can provide normalized fan vibration limits that can indicate that the module 210 includes one or more HDDs 212 that can be sensitive to fan vibration and acoustics, and that can provide a requested limit on a fan speed of the cooling fan 242, such as a threshold fan speed. In an embodiment, the controller 242 can utilize the information about the module 210 to identify that only certain fan speed ranges may be used as a function of thermal conditions, ambient temperature, and utilization, such that acoustical levels produced by the cooling fan 244 are kept below a desired threshold.

In an embodiment, the information about the module 210 may include ambient sensor correction values associated with the module. For example, the information can indicate that the module includes temperature sensors 216, such that ambient temperatures within the module can be measured by the sensors and then provided to the controller 242. In this embodiment, the controller 242 can utilize the temperatures measured in the module 210 to determine whether to vary the fan control settings for the cooling fan 244.

In an embodiment, the information can include fan population details for the module 210. For example, the fan population details can indicate that the module 210 includes a cooling fan 218. The information can also include an air flow tier for the module 210, such as an air flow impedance of the module, a P-Q fan curve for the module, fan speed limitations of the cooling fan, or the like. In an embodiment, the controller 242 can receive information indicating a module specific zoning policy. In this embodiment, the module specific zoning policy can identify that a particular portion or zone of the module 210 includes one or more devices or components, such as HDD 212, that can affect the air flow through the module and the information handling system 200. In this embodiment, the controller 242 may determine that the fan control setting should be updated to include higher fan speeds of the cooling fan 244 at a particular ambient temperature than the fan control setting without the module specific zoning policy being received. The controller 242 can then update fan control settings for cooling fan 244 based on the parameters of the module 210 and the current settings in the information handling system 200.

In an embodiment, the controller 242 can receive information identifying that the module 210 includes airflow sensors 216, and that during operation the controller 214 can provide the controller 242 with airflow sensor correlations and airflow targets. For example, the controller 214 can receive airflow measurements from one or more sensors 216, and can provide the airflow measurements to the controller 242 along with control parameters to cause the controller to control the air flow to a particular set point. The controller 242 can use the airflow measurements to change the settings of the cooling fan 244.

In an embodiment, the controller 242 can receive information identifying a normalized open loop cooling requirement for the module 210. In this embodiment, the module 210 may not include any temperature feedback capabilities, such that the controller 242 may not know the amount of air flow and/or ambient temperature in the module. In this situation, the normalized open loop cooling requirement can provide a fan curve to the controller 242 that can enable the sufficient air flow and cooling in the module 210 based on ambient temperatures in the information handling system 200.

In an embodiment, the information can include a thermal scaling factor for the module 210. The thermal scaling factor can cause the controller 242 to increase or decrease thermal control settings in the information handling system 200 based on a thermal impedance of the module 210, based on the PQ performance of the cooling fan 218, or the like. If the information includes a thermal scaling factor, the controller 242 can then update the fan control settings based on the thermal scaling factor of the module 210.

In an embodiment, the information about the module 210 can indicate a presence of one or more hardware components and/or sensors within the module. In this situation, the controller 242 can change the settings for components within the information handling system 200 to accommodate the hardware components and/or sensors within module 210. In an embodiment, the controller 242 can receive an air flow impedance for the module 210 as part of the information received from the controller 214. The controller 242 can then perform a chassis airflow correlation between the air flow of a configuration of the information handling system 200 and an air flow of the module 210. The chassis airflow correlation can provide a value that the controller 242 can use to adjust the thermal control settings in the thermal table 244. In an embodiment, the value can be based on the air flow impedance of the module 210, the air flow impedance of the information handling system 200, and the fan configuration and fan speed of the cooling fan 244.

In an embodiment, the information from the controller 214 can include that the power cap settings for the components in the information handling system 200 can be reduced or that the power cap settings need to be increased. For example, different configurations of the module 210 can increase or decrease air flow through the module 210 and as a result can increase or decrease the air flow in the information handling system 200. In an embodiment, if the configuration of the module 210 dramatically increases the air flow because of additional cooling fans, such as cooling fan 218, or because the module 210 has minimal air flow impedance, the controller 214 can communicate that power cap settings can be reduced in the information handling system 200. In an embodiment, reducing the power cap settings can enable the components within the information handling system 200 to receive more power because the additional air flow can increase the cooling of the components.

In an embodiment, the controller 242 can determine configurations of the information handling system 200 that are fresh air compliant and can provide these configurations to an individual. In an embodiment, a configuration of the module 210 can change what configurations of the information handling system 200 are fresh air compliant. In this situation, the information about the module 210, received at the controller 242, can include a redefined fresh air configuration. The controller 242 can receive the redefined fresh air configuration from the module 210, and can then provide the redefined fresh air configuration to the individual. In an embodiment, each of the parameters of the module 210, 220, or 250 can be stored in a field replaceable unit (FRU) in a backplane of the information handling system 200.

In an embodiment, thermal control settings of the information handling system can be defined based on a reference point or reference fan curve for the cooling fan 244. The controller 214 can provide a parameter to the controller 242 that can scale the thermal control setting of the information handling system to include a different fan curve of the cooling fan 244. Thus, different configurations of the module 210 can result in different fan curves of the cooling fan 244 as shown in FIG. 3.

Figure 3:
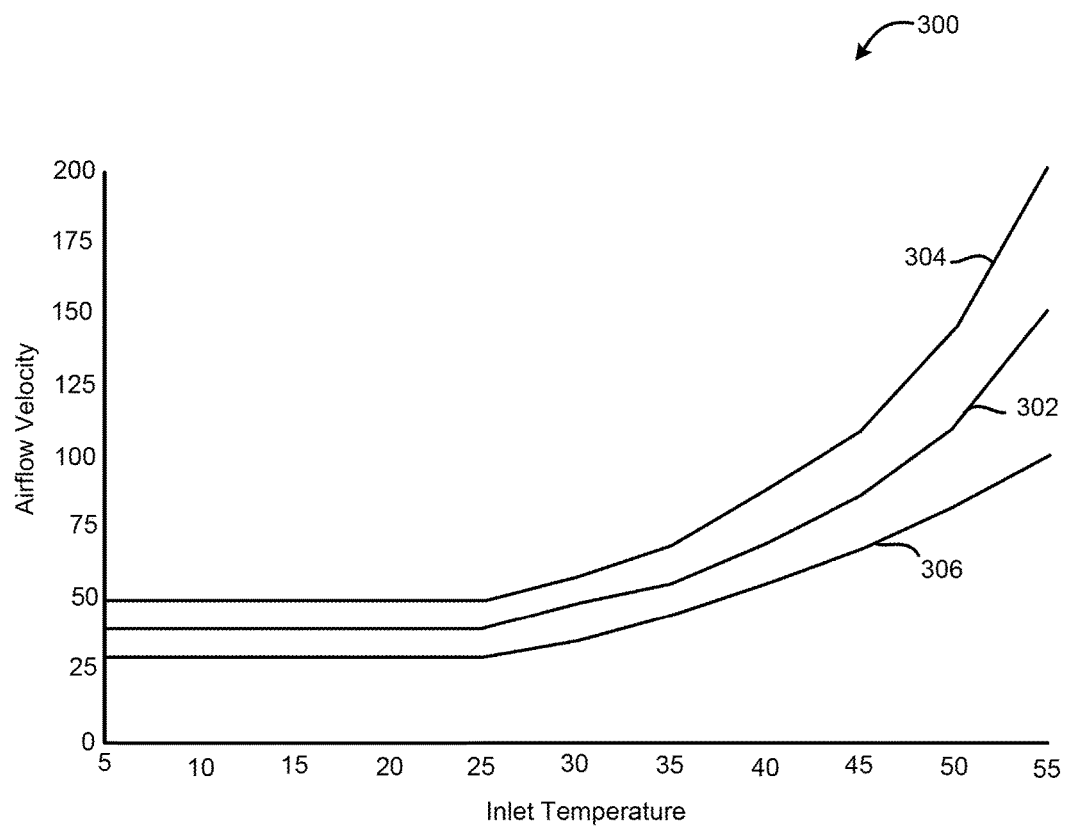
FIG. 3 is a graph representing cooling fan speeds of different thermal control settings fan curves at different conditions of the information handling system according to at least one embodiment of the present disclosure.

FIG. 3 illustrates a graph 300 representing cooling fan speeds of different thermal control settings fan curves 302, 304, and 306 at different ambient temperatures of the information handling system according to at least one embodiment of the present disclosure. In an embodiment, the first fan curve 302 can be a reference point for the thermal control settings of the information handling system 200. The parameter provided by the controller 214 can cause the controller 242 to automatically adjust an open loop fan curve for the cooling fan 244, adjust the power capping for components in the information handling system 200, and adjust ambient temperature limits for information handling system. For example, if the scaling factor provided by the controller 214 is less than 1, the scaling factor can indicate that the module 210 decreases the air flow in the information handling system 200. In this situation, the controller 242 can cause the fan speed of the cooling fan 244 to increase at each ambient temperature as compared to the first fan curve 302 to keep the same cooling capacity in the information handling system 200. Thus, a scaling factor less than 1 for a configuration of the module 210 can increase the first fan curve 302 to a second fan curve 304 as shown in FIG. 3.

However, if the scaling factor is greater than 1, the scaling factor can indicate that the module 210 increases the air flow in the information handling system 200. In this situation, the controller 242 can cause the fan speed of the cooling fan 244 to decrease at each ambient temperature as compared to the first fan curve 302 to keep the same cooling capacity in the information handling system 200. Thus, a scaling factor greater than 1 for a configuration of the module 210 can decrease the first fan curve 302 to a third fan curve 306 as shown in FIG. 3.

Referring back to FIG. 2, the information provided by the controller 214 may include a cooling tier for the module 210. In an embodiment, the cooling tier of the module 210 can be based on the air flow impedance characteristics of the module. The controller 242 can receive the cooling tier for the module 210, and can then cross reference the cooling tier of the module with a fan solution of the information handling system 200. The controller 242 can then determine appropriate scaling for open loop fan curves, power capping, and ambient temperature limits based on the cross referencing. Thus, the controller 242 can receive different information about the module 210 from the controller 214, and can adjust thermal control settings, fan control settings, open loop fan curves, power capping, and ambient temperature limits based on the information received from the controller 214. The controller 242 can then provide the updated control settings to the controller 242, which in turn can set different fan speeds of the cooling fan 244 based on the updated control settings.

Figure 4:
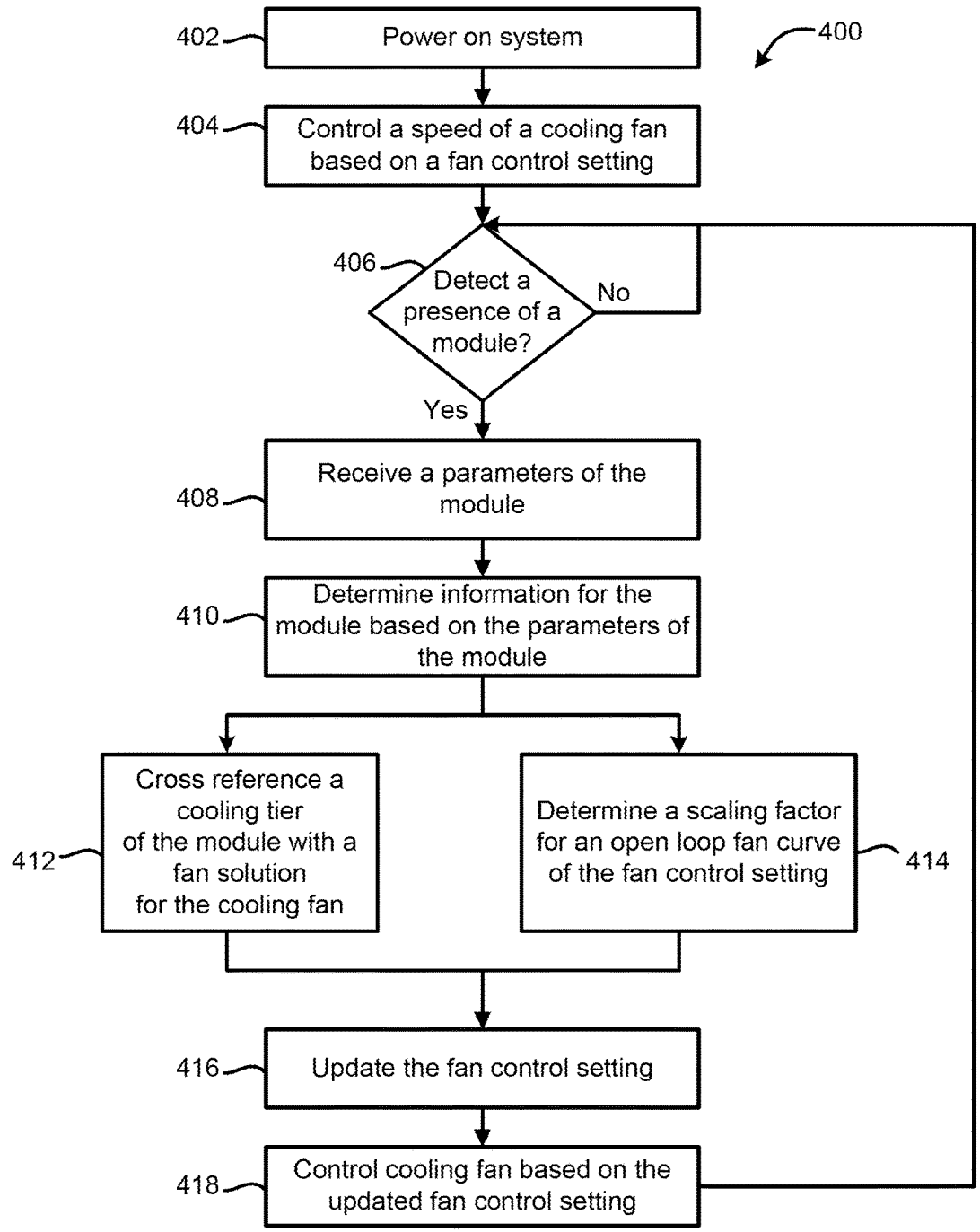
FIG. 4 is a flow diagram of a method for updating a fan control setting based on a module of the information handling system according to at least one embodiment of the present disclosure.

FIG. 4 illustrates a method 400 for updating a fan control setting based on a module of an information handling system according to at least one embodiment of the present disclosure. At block 402, a speed of a cooling fan is controlled based on a fan control setting by a controller of the information handling system. In an embodiment, the controller can utilize the fan control setting to change the speed of the cooling fan depending on the ambient temperature of the information handling system. At block 406, a determination is made whether a presence of a module is detected by a controller of the information handling system. In an embodiment, the module can be connected to an external panel, such as a front panel, of the information handling system, can be a component plugged within the information handling system, or the like.

When a module is detected the flow continues at block 408, and parameters of the module is received at the controller. In an embodiment, the parameters of the module can be received during a handshake or authentication between the controller of the information handling system and the controller of the module. At block 410, the information about the module is determined by the controller based on the parameters of the module. In an embodiment, the parameters can provide information about the module. In an embodiment, the information includes a cooling tier for the module. In an embodiment, the information can include fan population details, ambient sensor corrections, a module specific zoning policy, airflow sensor correlations and targets, normalized open loop cooling requirements, airflow tier, normalized fan vibration limits, thermal scaling factor, hardware and sensor presence, chassis airflow correlation, redefined power cap settings, and redefined fresh air configurations.

A cooling tier of the module is cross referenced with a fan solution for the cooling fan at block 412. At block 414, a scaling factor for an open loop fan curve of the fan control setting is determined based on the cross reference of the cooling tier with the fan solution. The fan control setting is updated based on the scaling factor for the open loop fan curve and the cross reference of the cooling tier with the fan solution at block 416. At block 418, the cooling fan is controlled based on the updated fan control settings. In an embodiment, FIG. 4 has been described with respect to fan control settings. However, the information about the module can be utilized to update any settings of the information handling system, such as power control settings or the like.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
a memory to store settings for components within the information handling system; and
a controller configured to communicate with the memory, the controller to detect a presence of a module, to receive parameters of the module from the module, to determine information for the module based on the parameters of the module, wherein the information includes particular locations within the module that include components that can affect the air flow though the module and the information handling system, and to update the settings for the components of the information handling system based on the information for the module, to cross reference a cooling tier with a fan solution for a cooling fan, to determine a scaling factor for an open loop fan curve of a fan control setting based on the cross reference of the cooling tier with the fan solution, and to update fan control settings based on the scaling factor for the open loop fan curve.

2. The information handling system of claim 1, wherein the information includes the cooling tier for the module.

3. The information handling system of claim 1, the controller to update the fan control settings based on the information for the module and a configuration of the information handling system.

4. The information handling system of claim 3, wherein the module is a component plugged within the information handling system.

5. The information handling system of claim 1, wherein the module is connected to an external panel of the information handling system.

6. The information handling system of claim 1, further comprising:
a thermal table to store the settings for the components, the controller to update the settings retrieved from the thermal table based on the information for the module.

7. The information handling system of claim 1, wherein the information for the module is selected from a group including fan population details, ambient sensor corrections, a module specific zoning policy, airflow sensor correlations and targets, normalized open loop cooling requirements, airflow tier, normalized fan vibration limits, thermal scaling factor, hardware and sensor presence, chassis airflow correlation, redefined power cap settings, and redefined fresh air configurations.

8. A method comprising:
controlling, by a controller of an information handling system, a speed of a cooling fan based on fan control settings;
detecting, by the controller, a presence of a module associated with the information handling system;
receiving, from the module, parameters of the module;
determining information for the module based on the parameters of the module, wherein the information includes particular locations within the module that include components that can affect the air flow though the module and the information handling system;
updating, by the controller, the fan control settings based on the information for the module;
cross referencing the cooling tier with a fan solution for the cooling fan;

determining a scaling factor for an open loop fan curve of the fan control setting based on the cross reference of the cooling tier with the fan solution; and updating the fan control settings based on the scaling factor for the open loop fan curve.

9. The method of claim 8, wherein the information includes a cooling tier for the module.

10. The method of claim 8, further comprising:
updating the fan control settings based on the information for the module and a configuration of the information handling system.

11. The method of claim 8, wherein the module is a component plugged within the information handling system.

12. The method of claim 8, wherein the module is connected to an external panel of the information handling system.

13. The method of claim 8, further comprising:
storing, by the controller, the fan control settings in a thermal table of the information handling system.

14. The method of claim 8, wherein the information for the module is selected from a group including fan population details, ambient sensor corrections, a module specific zoning policy, airflow sensor correlations and targets, normalized open loop cooling requirements, airflow tier, normalized fan vibration limits, thermal scaling factor, hardware and sensor presence, chassis airflow correlation, redefined power cap settings, and redefined fresh air configurations.

15. A method comprising:
controlling, by a controller of an information handling system, settings for components within the information handling system;

detecting, by the controller, a presence of a module associated with the information handling system;

receiving, from the module, parameters of the module;

determining information for the module based on the parameters of the module, wherein the information includes particular locations within the module that include components that can affect the air flow though the module and the information handling system;

updating the settings for the components of the information handling system based on the information for the module;

cross referencing a cooling tier with a fan solution for a cooling fan;

determining a scaling factor for an open loop fan curve of a fan control setting based on the cross reference of the cooling tier with the fan solution; and updating fan control settings based on the scaling factor for the open loop fan curve.

16. The method of claim 15, further comprising:
updating fan control settings based on information for the module and a configuration of the information handling system.

17. The method of claim 15, wherein the module is a component plugged within the information handling system.

18. The method of claim 15, wherein the module is connected to an external panel of the information handling system.

* * * * *